United States Patent [19]

Howarth

[11] 4,217,030
[45] Aug. 12, 1980

[54] FIBEROPTIC-ELECTRONIC CONNECTOR ASSEMBLY

[75] Inventor: Louis E. Howarth, New Providence, N.J.

[73] Assignee: Bell Telephone Laboratories, Incorporated, Murray Hill, N.J.

[21] Appl. No.: 925,702

[22] Filed: Jul. 18, 1978

[51] Int. Cl.[3] .................................................. G02B 5/14
[52] U.S. Cl. ................................. 350/96.21; 339/125 R
[58] Field of Search ........................ 350/96.20, 96.21; 250/227; 339/125 R, 136 M

[56] References Cited

U.S. PATENT DOCUMENTS

| | | | |
|---|---|---|---|
| 3,999,837 | 12/1976 | Bowen et al. | 350/96.22 |
| 4,050,783 | 9/1977 | Tardy | 350/96.21 |
| 4,056,305 | 11/1977 | Mc Cartney et al. | 350/96.21 |
| 4,081,208 | 3/1978 | Meade | 350/96.20 |
| 4,084,882 | 4/1978 | Hogan et al. | 350/96.20 |
| 4,087,155 | 5/1978 | Deacon | 350/96.21 |
| 4,099,832 | 7/1978 | Warner, Jr. | 350/96.21 |

Primary Examiner—Stewart J. Levy
Attorney, Agent, or Firm—Michael J. Urbano

[57] ABSTRACT

An assembly (10) for simultaneously making and breaking electrical and optical connections is described. The assembly includes locking means (12) for engaging a circuit pack to a frame (16); first and second electrical half-connectors (18, 20) and optical fiber half-connectors (22, 24) mounted on the frame and circuit board (14); guide means (26) into which the fiber half-connectors are insertable for axially aligning the fiber half-connectors; resilient means (28) for holding the fiber half-connectors in abutment when the circuit board is engaged with the frame by the locking means. A twist-lock arrangement (68, 72) for enabling ready coupling of first fiber half-connectors to a housing guide (70) is also included. Implementation of the assembly with both nested-rod fiber connectors (22, 24) and biconic connectors (122, 124) is described. Incorporation of the housing guide and guide means on a printed circuit board (FIG. 10), and a single fiber splicing scheme using the twist-lock arrangement (FIG. 11) are also described.

18 Claims, 11 Drawing Figures

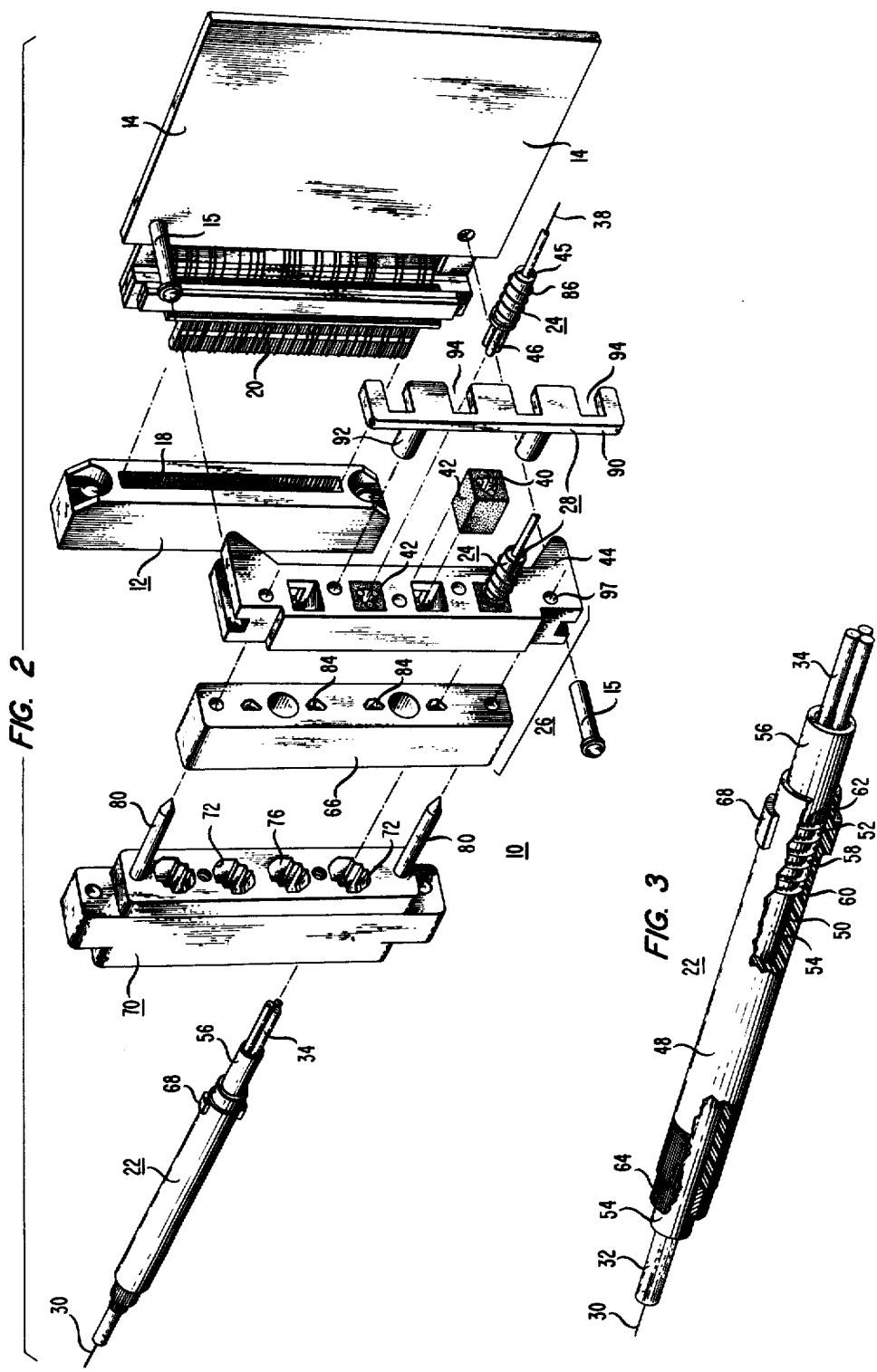

//4,217,030//

FIBEROPTIC-ELECTRONIC CONNECTOR ASSEMBLY

BACKGROUND OF THE INVENTION

This invention relates to connectors for use in fiber optic communication systems.

In a fiber optic telecommunication or data communication system optical fibers serve to carry pulse coded optical signals from a transmitter station, perhaps to one or more repeater stations, and then to a receiver station. Whether for the purpose of connecting fibers end-to-end in a long haul system or of splicing together fibers broken by environmental elements or otherwise, it has long been recognized that some form of optical connector would be required to make accurately aligned connections between pairs of single fibers or between pairs of fiber arrays or ribbons.

Two of the predominant optical connectors for pairs of single fibers are the biconic connector described by P. K. Runge in copending application Ser. No. 630,930 filed on Nov. 11, 1975 and the nested rod connector of A. W. Warner, Jr. in copending application Ser. No. 754,603 filed on Dec. 27, 1976 (now U.S. Pat. No. 4,009,832), both of which are assigned to the assignee hereof. On the other hand, connecting ribbons of fibers in a fiber cable, for example, can be accomplished in a number of ways, but one of the more elegant, yet simple, utilizes parallel V-grooves etched in a semiconductor wafer as described by C. M. Miller in U.S. Pat. No. 3,984,172 issued on Oct. 5, 1975 and also assigned to the assignee hereof.

Despite all of the activity in the optical connector art, little attention, if any, has been given to making connections at opto-electronic interfaces (e.g., transmitters, repeaters and receivers) where both optical and electronic connections are required. And, notwithstanding that the relatively new optical connector art has borrowed heavily from the more mature electrical connector art, the need for a device capable of making simultaneous optical and electrical interconnections remains unsatisfied. This type of connector might find application, for example, in an electronic switching system (ESS) in which fiber optic data links may be used to interconnect different electronic equipments. In the No. 4 ESS manufactured by Western Electric Company such data links have been proposed to interconnect time slot interchangers with voice interface frames, time multiplexed switches and clock circuits, and to interconnect peripheral unit buses with the No. 1A processor and the time multiplexed switches.

These fiber optic data links are being given serious consideration as replacements for coaxial cable links for a number of reasons: optical signals offer wider bandwidth and are immune to electromagnetic interference; and fiber optic interconnections electrically isolate the interconnected equipment on different frames, and reduce the cable congestion on frames. But, in order to realize these advantages in a cost effective way, more than one data link should be included on each opto-electronic interface; i.e., on each circuit pack which includes the electronics necessary for driving optical transmitters or detecting optical data. This implies the need to interconnect arrays of individual optical fibers. In addition, from the standpoint of serviceability, it is desirable that maintenance personnel be able to remove readily the circuit packs in order, for example, to replace defective ones or to rearrange connections as the system usage expands.

SUMMARY OF THE INVENTION

In accordance with one aspect of the invention, a connector assembly enables electrical and optical interconnections to be made simultaneously between an opto-electronic circuit pack and opto-electronic equipment mounted on a frame. The assembly comprises: locking means for engaging the circuit board to the frame; first and second electrical half-connectors mounted, respectively, on the frame and the circuit board; first and second optical fiber half-connectors mounted respectively on the frame and the circuit board; guide means into which the fiber half-connectors are insertable for axially aligning the fiber half-connectors with one another; the fiber half-connectors and the guide means being mutually adapted so that the ends of the fiber half-connectors abut one another upon insertion into the guide means; and resilient means for holding the fiber half-connectors in abutment when the circuit board is engaged with the frame by the locking means.

The assembly can be implemented with various types of electrical half-connectors (e.g., arcuate finger edge connectors) as well as a variety of optical half-connectors (e.g., biconic or nested-rod arrangements).

In one embodiment of the invention the first fiber half-connector is removably mounted on the frame by means of a twist-lock arrangement comprising: a tubular housing having a narrow bore coaxial with a wider bore; a tube which slides in the narrow bore and through which a sheathed fiber extends, the first fiber half-connector being mounted on the end of the tube; a spring which surrounds the tube and is positioned only in the wider bore section of the housing; and lug means on the outer surface of the housing adapted to engage corresponding recesses in a channeled housing guide. In operation, the housing is inserted into a channel of the housing guide until the end of the tube or the fiber half-connector abuts a stop on the guide means. The housing is pushed in slightly compressing the spring and is turned so that the lugs are rotated into recesses of the housing guide, thus releasably locking the first-half connector into place.

In another embodiment, the resilient means includes a spring coaxially surrounding a fiber half-connector and a comb member secured to the guide means with the spaces between the teeth of the comb (i.e., the merlons) aligned with guiding channels in the guide means so that the half-connector protrudes from a channel and extends through the corresponding merlon. The spring is positioned between the guide means and the comb member and abuts a collar on the half-connector so as to force the half-connector into one end of the channel. When the other half-connector is inserted into the opposite end of the channel, so as to abut the one half-connector, the spring is compressed, thereby maintaining a positive force on the half-connectors which keeps them abutted.

Inasmuch as the comb member and spring extend over the circuit board, they necessarily occupy space which otherwise would be available for electronic components. Accordingly, in a third embodiment, which advantageously employs biconic fiber connecters, the resilient means is removed from its location over the circuit board and is incorporated into the guide means. In this embodiment, the guide means includes a free-floating biconic sleeve which is adapted to receive and align biconic fiber half-connectors inserted into its opposite ends. The spring surrounds the sleeve and, as before, is compressed by the fiber half-connectors, thus holding them in abutment.

The invention is particularly suited to simultaneously making and breaking electrical and optical connections to satisfy the foregoing needs but in its broader aspects is not so limited. Thus, in another embodiment the housing guide (including the twist-lock arrangement), guide means and resilient means can all be mounted together, for example, on a printed circuit board. In this case, electrical and optical connections would be made separate from another, but the fiber connector assembly would provide the desired serviceability.

In another aspect, the invention can be adapted to making single fiber splices; to wit, a pair of housing guides can be employed to align a pair of identical fiber half-connectors each provided with a twist-lock arrangement.

BRIEF DESCRIPTION OF THE DRAWING

The invention, together with its various features and advantages, can be readily understood from the following more detailed description taking in conjunction with the accompanying drawing in which:

FIG. 2 is an exploded view of the connector assembly of FIG. 1 viewed from the circuit pack;

FIG. 3 is a partially cut-away, isometric view of the tubular housing arrangement for releasably locking the first fiber half-connectors into the housing guide;

DETAILED DESCRIPTION

Nested-Rod Arrangement

Figure 1:
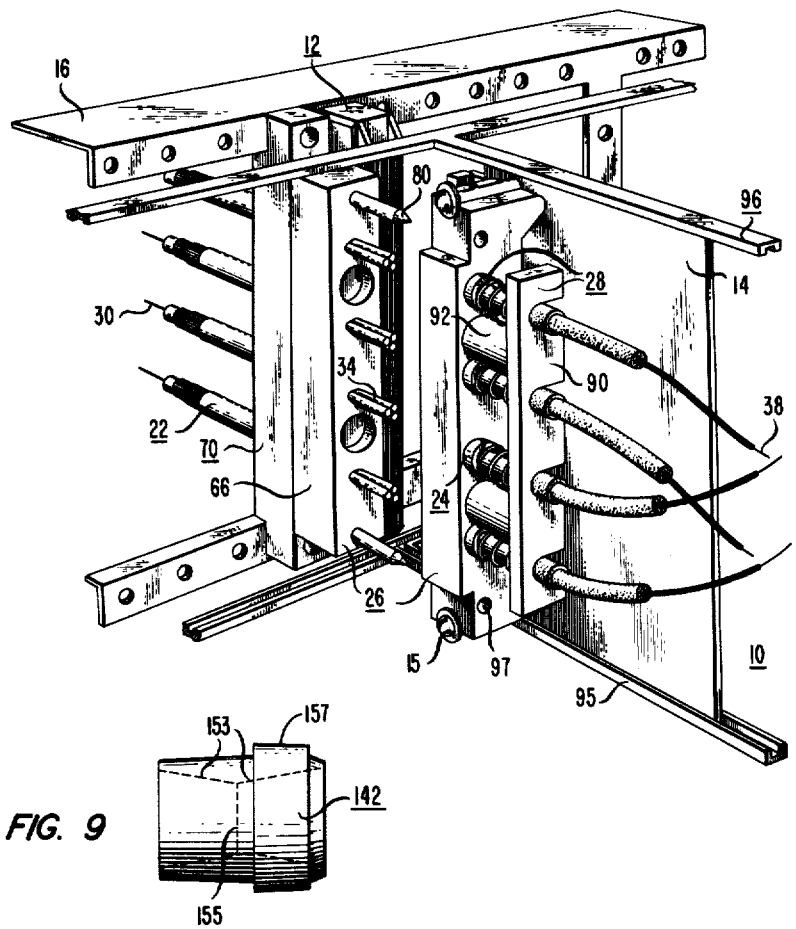
FIG. 1 is a pictorial view of one embodiment of the connector assembly employing nested-rod fiber connectors.

With reference now to FIGS. 1-5, there are shown various views of a fiberoptic-electronic connector assembly 10 in accordance with one embodiment of the invention. The assembly comprises locking means 12 for engaging a circuit pack (only the board 14 is shown) to a frame 16; first and second electrical half-connectors 18 and 20 mounted, respectively, on the frame 16 and on the board 14 (in this example, half-connector 18 is actually a part of locking means 12 which is mounted on frame 16); first and second optical fiber half-connectors 22 and 24 mounted, respectively, on the frame 16 and the pack 14; and guide means 26 into which the fiber half-connectors 22 and 24 are insertable for effecting their axial alignment to one another. The fiber half-connectors 22 and 24 and the guide means 26 are mutually adapted, as described hereinafter, so that the ends of the fiber half-connectors abut one another upon insertion into guide means 26. Resilient means 28 holds the fiber half-connectors in abutment in response to the engaging of the board 14 with the frame 16 by the locking means 12.

Figure 4:
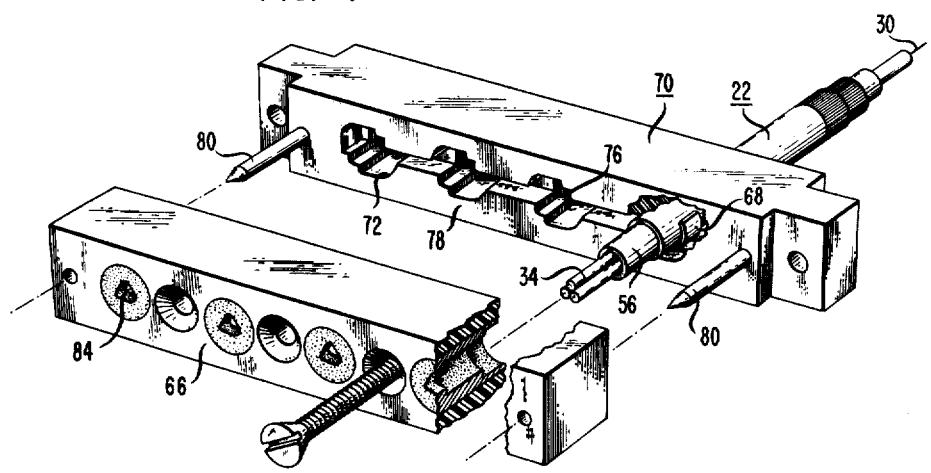
FIG. 4 shows how the housing of FIG. 2 interacts with the housing guide.
Figure 5:
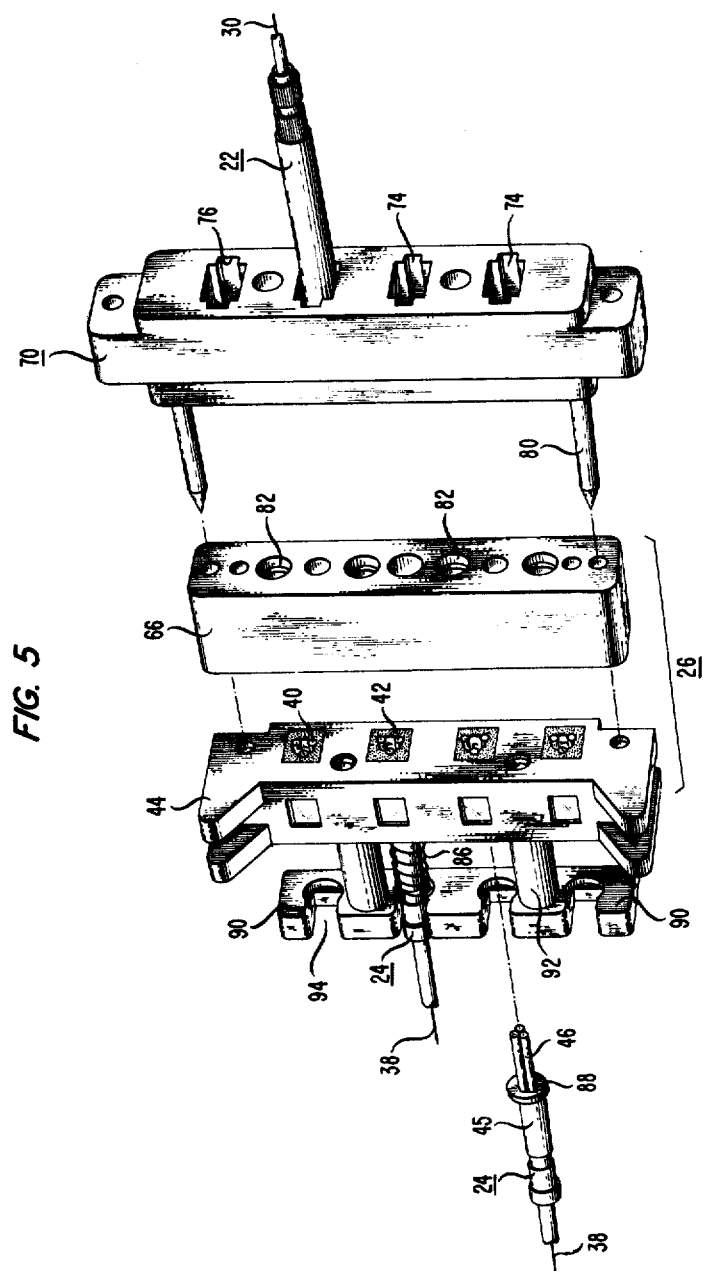
FIG. 5 is an exploded view of the connector assembly of FIG. 1 viewed from the frame.

For purposes of illustration, the assembly of FIGS. 1-5 is shown to be implemented with nested-rod fiber half-connectors of the type described in the aforementioned application of A. W. Warner, Jr. That is, as shown in FIG. 3, an end portion of one optical fiber 30 stripped of its protective sheath 32 is secured in the channel formed between three holding rods 34, also referred to as a fiber guide holder. In order to align the holding rods and hence the fibers 30 and 38, guide means 26, as shown in FIGS. 2 and 5, includes an arrangement of three larger diameter, spaced apart guide rods 40 adapted so that, when the holding rods are inserted therebetween, each guide rod contacts an adjacent pair of holding rods. The guide rods are mounted in a resilient plug 42 so as to give slightly when the holding rods are inserted, thereby facilitating alignment. The plugs are carried by support member 44. The holding rods 34 and 46 are inserted into opposite sides of the guide rod-plug assembly until their ends abut one another. As described later, resilient means 28 holds the holding rods, and hence the fiber ends, in abutment.

In one embodiment of the invention the first fiber half-connectors 22 are removably mounted on frame 16 by means of a twist-lock arrangement which lends a high degree of serviceability to the assembly by permitting ready replacement or movement of fibers as system demands dictate. Thus, the first half-connector 22, as shown in FIG. 3, includes a tubular housing 48 having a narrow bore 50 coaxial with a wider bore 52. A tube, which is slidably and rotatably inserted in the housing, has a narrow diameter segment 54 which slides in the narrow bore 50 and a wider diameter coaxial segment 56 which slides in the wider bore 50. Holding rods 34 are inserted into tube segment 56 so that the sheathed fiber extends through tube segment 54 and a stripped end portion of the fiber extends through segment 56 (i.e., through the central channel of holding rods 34). A spring 58 surrounds the narrow segment 54 of the tube but is positioned only in the wider bore section 52 of housing 48. It is retained in place between the flanges 60 and 62 formed by the different diameters of the housing bores and the tube segments. A knurled ring 64, which fits snugly over the end of tube segment 54, acts as a stop for the housing 48 against the urging of spring 58 and also serves to enable ready rotation of the tube for proper insertion into the orientation member 66 to be later described. A pair of lugs 48 are provided on the outer surface of housing 48 and, as shown in FIGS. 2 and 4, are adapted to engage corresponding curved recesses 72 in a channeled housing guide 70 which is mounted on frame 16. The housing guide 70, as shown in FIG. 5, has a plurality of rectangular channels 74 extending therethrough, with each channel having a pair of slots 76 in which the lugs 68 slide. Curved recesses 72, shown in FIGS. 2 and 4, intersect slots 76 at the surface 78 of housing guide 70 which abuts orientation member 66. Guide pins 80 align the cylindrical channels 82 (FIG. 5) in orientation member 66 with the rectangular channels 74 in housing guide 70, and with the central axis of guide rods 40 of the nested-rod arrangement. By comparing FIGS. 2, 4 and 5, it is apparent that the cylindrical channels 82 in orientation member 66 are adapted to receive the wider diameter tubular segments 56, and the ends of these channels remote from housing guide 70 terminate in triangular apertures 84 adapted to receive the three holding rods 34 of each fiber half-connector.

In operation of the twist-lock arrangement, a fiber half-connector 22 is inserted, as shown in FIG. 5, into a rectangular channel 74 in housing guide 70 by inserting lugs 68 into slots 76, as shown in FIGS. 1 and 4, and by rotating the tube via knurled ring 64 until holding rods 34 extend through triangular aperture 84 in orientation member 66. Then, the housing 48 is pushed inwardly so that the wider diameter segment 56 of the tube abuts the triangular apertured end of channel 82 of orientation member 66, thereby compressing the spring 58 to its solid height. The housing 48 is now rotated so that lugs 68 are moved into recesses 72 of housing guide 70, thereby locking the fiber half-connector 22 in place on the frame, i.e., in place in housing guide 70 and orientation member 66. Once in place, the holding rods 34 protrude through orientation member 66 as shown in FIG. 1 and are ready for alignment with the second fiber half-connectors 24.

Before discussing this alignment, however, it will be helpful to describe first the second fiber half-connector 24 and the resilient means 28 which maintains the fiber half-connectors in abutment once aligned. As with the first fiber half-connector 22, the second half-connector 24 includes a tube 45 into which holding rods 46 are inserted. Fiber 38, to be aligned with fiber 30, is secured between holding rods 46, also referred to as a fiber guide holder. For protective purposes the portion of the fiber 38 which protrudes from tube 45 is covered with a loose fitting jacket and is part of a short, easily manipulated fiber segment referred to as a pigtail. The other end of the pigtail (not shown) would be coupled to an opto-electronic device (e.g., a laser, LED or photodiode) on the circuit board 14.

Resilient means 28 comprises a spring 86 which surrounds tube 45 and is constrained between collar 88 on the end of tube 45 and a comb member 90 secured to support member 44 by posts 92. The merlons 94 of the comb members are aligned with the guiding channels formed by guide rods 40. The support member 44 is mounted on board 14 by means of posts 15. These components are assembled by inserting the holding rods 46 of the second fiber half-connector part way into the channel formed by the guide rods with the collar 88 abutting the support member 44. Spring 86 pushes against the collar 88 and the comb member 90 and thus retains the second half-connector in place.

In order to discuss operation of the fiberoptic-electronic connector assembly 10, assume that the various components are assembled as described above and as shown in FIG. 1. A circuit board 14 to be connected to equipment (not shown) on frame 16 is inserted into a pair of parallel U-shaped tracks 95 of a cage 96 which is mounted on frame 16. These tracks are aligned so as to place the electrical half-connectors 18 and 20 and the fiber half-connectors 22 and 24 in substantial registration. The tracks guide the board 14 so that the male electrical half-connector 20 enters the female half-connector 18 and snaps into place. Thus, in this case the locking means 12 is actually a mutual adaptation of the slot into which the female half-connector 18 is mounted and the shape of the male half-connector. For example, the electrical connector might be a 946B connector manufactured by Western Electric Company, as shown in FIG. 2, in which case the arcuate fingers of the male half-connectors are compressed when inserted into the female half-connector 18 to effect the snap fit. Alternatively, if the electrical half-connectors do not effect a locking function, a separate locking fixture, such as a latch or bolt, would be incorporated to hold the connectors together.

As the male electrical half-connector 20 is being inserted into the female half-connector 18, the guide pins 80 on the housing guide 70 enter holes 97 in support member 44, and the holding rods 34 of the first fiber half-connector 22 are simultaneously entering the support member 44 where the guide rods 40 align the ends of fibers 30 and 38 with one another. Eventually the ends of the holding rods 34 abut the ends of the holding rods 46, and the continued inward travel of the board 14 compresses spring 86, thereby supplying a force which holds the fiber half-connectors in abutment.

Although only four fiber connectors are depicted in FIG. 1, it is of course apparent that the actual number of connectors in the assembly would be dictated by design and space considerations. It is also apparent that assembly 10 provides a high degree of serviceability. Circuit boards 14 can be readily changed without disturbing the fiber half-connectors 22 on frame 16. A particular fiber half-connector 22, on the other hand, can be removed from the frame via the twist-lock feature without having to move the circuit board or disturbing other half-connectors 22.

The space on the circuit board, as mentioned previously, is often very crowded with components of the circuit pack. In some applications, therefore, it may be desirable to move the resilient means 28 so that it does not overhang the circuit board. In addition, other types of fiber connectors can be employed within the scope of the invention. Next described is a fiberoptic-electronic assembly which realizes both of these possibilities.

Biconic Arrangement

Figure 7:
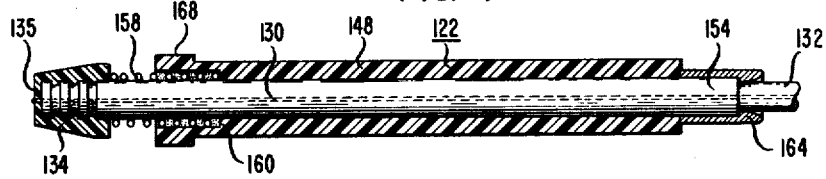
FIGS. 7 and 8 are cross-sectional views of the two fiber half-connectors of FIG. 6.
Figure 8:
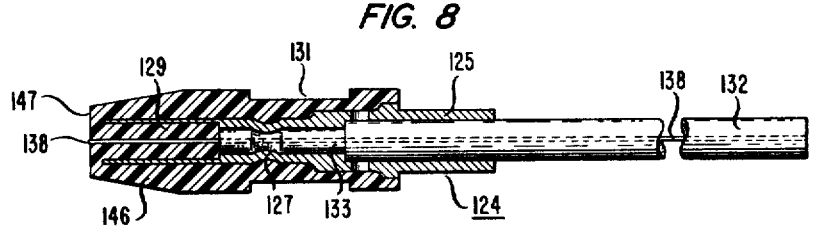
Figure 6:
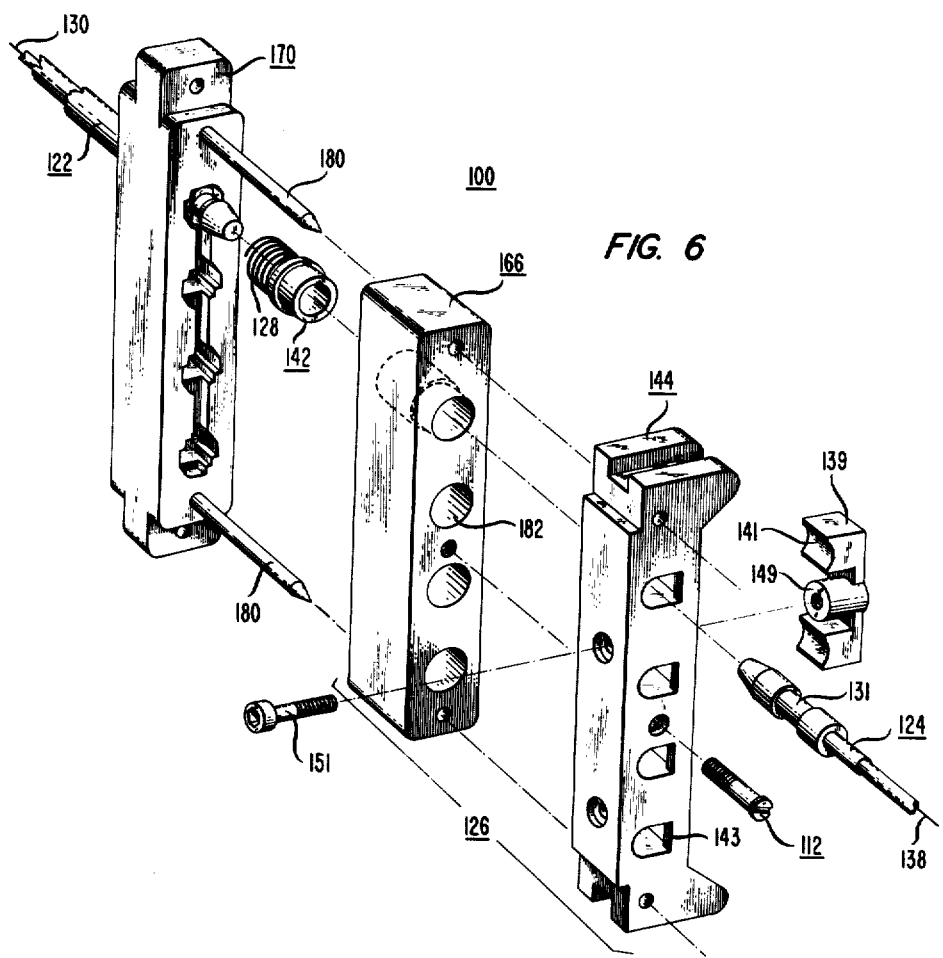
FIG. 6 is an exploded view of another embodiment of the connector assembly employing biconic fiber connectors.

With reference now to FIGS. 6-8, there is shown another embodiment of the invention incorporating biconic fiber connectors of the type described in the aforementioned application of P. K. Runge and including modifications of the structure to eliminate most of the component overhang of the circuit board. For simplicity, the electrical half-connectors, frame and circuit board are not shown.

The fiberoptic-electrical connector assembly 100 includes many components which are substantially identical in design and/or function to those of assembly 10. Accordingly, the components of assembly 100 corresponding to those of assembly 10 having been given the same reference numbers increased by 100.

Thus, assembly 100 includes biconic fiber half-connectors 122 and 124 to be aligned by means of housing guide 170 and guide means 126 which, as before, includes an orientation member 166 and a support member 144. The orientation member 166 is secured to housing guide 170 which in turn is illustratively mounted on a frame (not shown). On the other hand, support member 144 is mounted on a circuit board (also not shown). The first fiber half-connector 122 shown in FIG. 7 comprises a housing 148 similar to the one shown in FIG. 3. The housing includes a narrow diameter bore into which tube 154 is slidably inserted and a wider diameter bore for receiving spring 158 which surrounds the tube. The spring is lodged between flange 160 and the base of truncated cone, fiber guide holder 134 which is threaded onto the end of tube 154. A sheathed fiber (sheath 132, fiber 130) extends through the tube, and a stripped end portion of the fiber is terminated in cone 134 substantially flush with the truncated end surface 135. The fiber half-connector 122 is mounted in housing guide 170 by a twist-lock arrangement identical to that previously described; i.e., lugs 168 twist into recesses in the channels of housing guide 170.

The second fiber half-connector 124 shown in FIG. 8 comprises a metal (e.g., brass) tube insert 125 secured to a partially sheathed and partially stripped fiber as follows: the outer sheath 132 and inner sheath 133 are stripped from an end portion of the fiber 138 but only the outer sheath is stripped from a central portion; the fiber thus stripped is inserted into tube 125 which is crimped in the central portion at 127; the truncated cone, fiber guide holder 146 is then molded around the fiber and tube so that a portion 129 of the molding material (e.g., epoxy) enters the end of the tube filling the space between the fiber and tube; the fiber 138 is then polished flush with the truncated end face 147. In addition, the connector body has a recess 131 adapted to engage a clamp 139 to be described later with reference to FIG. 6. Alternatively, the function of the recess 131 could be performed by a pair of snap rings located in the position of the shoulders of the recess.

The fiber half-connectors 124 are inserted into U-shaped channels 143 of support member 144 (FIG. 6) and are locked into place by a clamp 139. The latter has a pair of curved wing members 141 joined by a central support piece 149 which has a threaded hole. The clamp fits into a cavity (not shown) in the side of the support member 144, so that curved wings 141 fit into recesses 131 of half-connectors 124. As depicted, clamp 141 is capable of holding two half-connectors 124 in place (although only one is shown) by threading screw 151 through support member 144 into the hole in the central support piece 149 of clamp 139.

Figure 9:
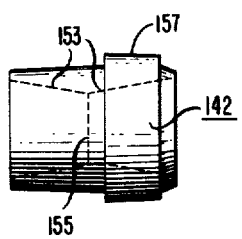
FIG. 9 is a cross-sectional view of the free-floating sleeve used to align the fiber half-connectors of FIGS. 7 and 8.

In order to align the ends of the half-connectors 122 and 124, and hence the fibers 130 and 138, orientation member 166 shown in FIG. 6 is provided with cylindrical channels 182 each adapted to receive a free-floating sleeve 142. The end of each channel 182 proximate support member 144 has a narrow diameter bore which acts as a stop for sleeve 142. As shown in FIG. 9, the sleeve 142 has a pair of biconical bores or inner surfaces 153 adapted to receive the truncated cones 134 and 146 of half-connectors 122 and 124 so that their truncated end faces 135 and 147 abut at plane 155. Resilient means 128, depicted as a spring in FIG. 6, surrounds the sleeve 142 and is lodged between collar 157 on the sleeve and the housing guide 170. Collar 157 abuts the narrower diameter end of channel 182.

In operation, first fiber half-connectors 122 are mounted in housing guide 170 by the aforementioned twist-lock arrangement. This action compresses resilient means 128 and forces sleeves 142 against the end of channels 182. It should be recalled that orientation member 166 as assembled abuts against housing guide 170. Second fiber half-connectors 124, to be aligned with connectors 122, are locked into support member 144 via clamps 139. The circuit board (not shown) which carries the support member 144 and an electrical half-connector (not shown) are slid into place in the fashion of FIG. 1 so that the electrical half-connectors engage, the pins 180 bring the housing guide 170 and guide means 126 into alignment, and the fiber half-connectors enter sleeves 142 from opposite ends. The free-floating sleeves guide the truncated cones of the fiber half-connectors into aligned and resilient means 128, holds the end faces of the connectors, and hence the ends of the fibers in abutment.

Locking means 112 in this embodiment is illustratively depicted as a screw which extends through a hole in support member 144 and is threaded into another hole in orientation member 166. This type of locking means is advantageous where the electrical half-connectors provide no snap fit or an insufficient fit to hold the pieces together against the urging of resilient means 128.

Figure 10:
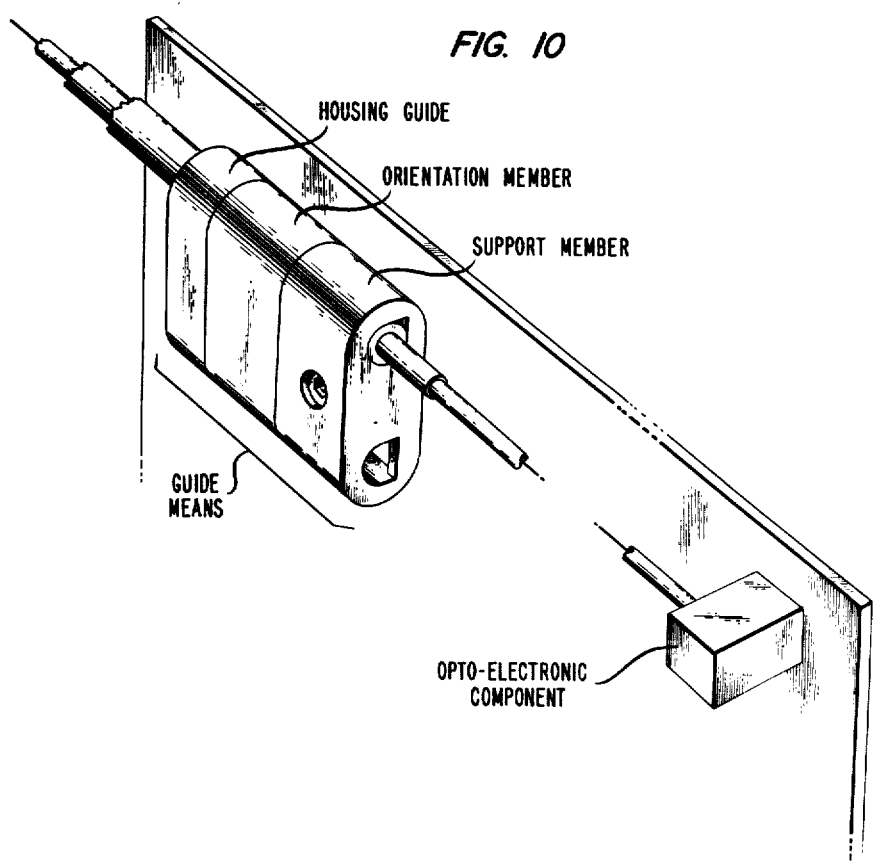
FIG. 10 is an isometric view of a fiber connector assembly mounted on a printed circuit board.
Figure 11:
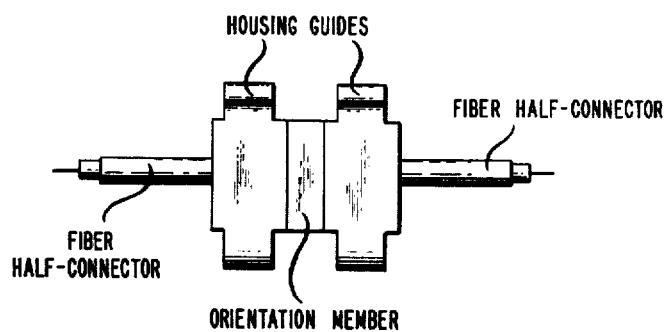
FIG. 11 is a side view of another embodiment of the invention adapted for making single fiber splices.

It is to be understood that the above-described arrangements are merely illustrative of the many possible specific embodiments which can be devised to represent application of the principles of our invention. Numerous and varied other arrangements can be devised in accordance with these principles by those skilled in the art without departing from the spirit and scope of the invention. In particular, although the housing guide (30,130), guide means (26,126) and resilient means (28,128) have been depicted with the components split between a frame (16) and a circuit board (14) so as to effect simultaneous make-break electrical and optical connections, it is also possible to use the assembly where such simultaneous connections are not required, e.g., the housing guide, orientation member, support member, etc. all could be mounted on a printed circuit board as shown in FIG. 10. Alternatively, as shown in FIG. 11, a pair of housing guides, each with twist-lock arrangements, and an orientation member sandwiched therebetween, can be used to interconnect (i.e., splice) a pair of fibers using half-connectors of the type depicted in either FIG. 3 or FIG. 7.

I claim:
1. An assembly (10,100) characterized by the ability to make or break simultaneously electrical and optical fiber connections between opto-electronic equipment mounted on a circuit board (14) and opto-electronic equipment mounted on a frame (16) comprising
   locking means (12,112) for engaging the board to the frame,
   first (18) and second (20) electrical half-connectors mounted, respectively, on the frame and on the board,
   first (22,122) and second (24,124) optical fiber half-connectors mounted, respectively, on the frame and on the board,
   guide means (26,126) into which the fiber half-connectors are insertable for axially aligning and abutting the fiber half-connectors with one another; and
   resilient means (28,128) for holding the fiber half-connectors in abutment when the board is engaged with the frame by the locking means.

2. The assembly of claim 1 further including a twist-lock arrangement comprising
   a housing guide (70,170) mounted on the frame and having a plurality of channels (74) extending therethrough for receiving the first fiber half-connectors, the guide having a plurality of recesses (72) each of which intersects one of the channels,
   each first fiber half-connector including a rotatable housing (48,148) and lug means (68,168) on the outer surface thereof which engages the recesses when the housing is inserted into a channel and rotated.

3. The assembly of claim 2 wherein each housing has a narrow diameter bore (50) and a wider diameter bore (52) coaxial therewith and located near end of the housing, and wherein each of said first fiber half-connectors includes
- a tube (54,154) slidably and rotatably inserted in a housing,
- a first fiber guide holder (34,134) mounted on one end of the tube and having an end surface for abutting one of the second fiber half-connectors,
- an optical fiber (30,130) extending through the tube and terminating at the end surface, and
- a spring (58,158) surrounding the tube and positioned in the wider diameter bore between the narrow diameter bore and the holder, the spring being compressed when the housing is inserted in a channel of the housing guide and being effective to releasably lock the lug means into the recesses.

4. The assembly of claims 2 or 3 wherein the guide means includes
- an orientation member (66,166) secured to the housing guide and having a plurality of channels (82,182) in registration with those of the housing guide, and
- a support member (44,144) mounted on the circuit board and having a plurality of channels in registration with those of the orientation member and the housing guide, the second fiber half-connectors (24,124) being mounted in the channels of the support member.

5. The assembly of claim 4 wherein the second fiber half-connectors include second fiber guide holders (46,146) and the resilient means (28) comprises
- a comb member (90) mounted on the support member and having a plurality of merlons (94) in registration with the channels of the support member, so that the second fiber half-connectors extend through the merlons when the second fiber guide holders are inserted in the support member, and
- a spring (86) surrounding each of the second fiber half-connectors (24) and positioned between the support member and the comb member.

6. The assembly of claim 5 wherein
- said fiber guide holders (34,46) each comprises three holding rods surrounding an optical fiber,
- said support member (44) includes a resilient plug (42) inserted in each of the channels thereof, and
- three larger diameter, spaced apart guide rods (40) are mounted in each plug so as to align the fiber guide holders when inserted into opposite ends of the plug.

7. The assembly of claim 4 wherein the second fiber half-connectors include second fiber guide holders (46,146), and the resilient means (128) includes a spring positioned in each channel of the orientation member so as to be compressed upon the insertion of the fiber guide holders into opposite ends of the channels.

8. The assembly of claim 7 wherein
- the fiber guide holders (134,146) each comprise a truncated cone coaxially surrounding a fiber and having a flat end surface at which the fiber terminates, and including
- a biconical sleeve (142) free-floating in each of the channels of the orientation member, and adapted to align the fiber guide holders when inserted into the opposite ends thereof, a spring of the resilient means (128) surrounding each sleeve.

9. The assembly of claim 8 wherein the support member (144) has a plurality of cavities extending from a side surface thereof into its channels (143) and includes at least one clamp (139) which fits into the cavities and secures the second fiber half-connectors (124) into the channels.

10. The assembly of claim 9 wherein each clamp includes a pair of curved wing members (141) and a center support piece (149) joining the wing members together, the support piece being affixable to the support member (144) so that the wing members fit into adjacent cavities and secure a pair of second fiber half-connectors into the channels (143).

11. The assembly of claim 7 wherein the locking means (112) includes a fastener which extends through the support member (144) and engages the orientation member (166).

12. An assembly (10,100, FIG. 10) for aligning at least one pair of optical fibers, (30-38, 130-138) each mounted in a separate fiber half-connector (22-24, 122-124), by means of an alignment apparatus which surrounds the half-connectors, characterized in that:
- the apparatus includes a housing guide (70,170) having a plurality of channels (74) extending therethrough for receiving first fiber half-connectors, the guide having a plurality of recesses (72) each of which intersects one of the channels,
- each first fiber half-connector includes a rotatable housing (48,148) and lug means (68,168) on the outer surface thereof which engages the recesses when the housing is inserted into a channel and rotated,
- the apparatus further includes: an orientation member (66,166) secured to the housing guide and having a plurality of channels extending therethrough in registration with those of the housing guide; a support member (44,144) adjacent the orientation member and having a plurality of channels extending therethrough in registration with those of the housing guide and support member; second fiber half-connectors (24,124) being secured in the channels of the support member and extending into the orientation member where they abut the first fiber half-connectors (22,122); and resilient means (28,128) for holding the fiber half-connectors in abutment.

13. The assembly of claim 12 further characterized in that (FIG. 11):
- the support member comprises a second housing guide having a plurality of second channels extending therethrough for receiving second fiber half-connectors, the second guide having a plurality of second recesses each of which intersects one of the second channels, the channels of both housing guides being in registration with one another, and
- each second fiber half-connector includes a rotatable second housing and second lug means on the outer surface thereof which engages second recesses when the second housing is inserted into a second channel and rotated so that the half-connectors abut one another against the urging of the resilient means.

14. The assembly of claim 12 or 13 further including an alignment sleeve (142) free-floating in each channel of the orientation member, and wherein the resilient means (128) comprises a spring surrounding each sleeve.

15. The assembly of claim 14 wherein the fiber half-connectors comprise truncated cones (134,146) in which the fibers are secured, and the sleeve (142) has a biconic interior surface for aligning first and second half-connectors when their truncated cones are inserted into opposite ends thereof.

16. The assembly of claim 12 wherein the support member (144) has a plurality of cavities extending from a side surface thereof into its channels (143) and includes a plurality of clamps (139) which fit into the cavities and secure the second fiber half-connectors (124) into the channels.

17. The assembly of claim 16 wherein each clamp includes a pair of curved wing members (141) and a center support piece (149) joining the wing members together, the support piece being affixable to the support member so that the wing members fit into adjacent cavities and secure a pair of second fiber half-connectors into the channels (143).

18. The assembly of claim 14 wherein each housing has a narrow diameter bore (50) and a wider diameter bore (52) coaxial therewith and located near one end of the housing, and wherein a tube is slidably and rotatably inserted in each housing, a fiber guide holder is mounted on one end of each tube and has an end surface for abutting an end surface of another holder, an optical fiber extends through each tube and terminates at the end surface, and a spring surrounds each tube and is positioned in the wider diameter bore between the narrow diameter bore and the holder, the spring being compressed when the housing is inserted in the housing guide and being effective to releasably lock the lug means into the recesses.

* * * * *